United States Patent [19]
Parimore, Jr. et al.

[11] Patent Number: 5,188,398
[45] Date of Patent: Feb. 23, 1993

[54] REDUNDANTLY LOCKED FLUID COUPLING

[75] Inventors: Thomas N. Parimore, Jr.; Christopher R. Koss, both of West Chester, Ohio

[73] Assignee: General Electric Company, Cincinnati, Ohio

[21] Appl. No.: 815,998

[22] Filed: Jan. 2, 1992

[51] Int. Cl.$^5$ .............................. F16L 35/00
[52] U.S. Cl. ........................ 285/39; 285/86; 285/92; 285/330
[58] Field of Search ............ 285/39, 92, 82, 86, 285/330

[56] References Cited

U.S. PATENT DOCUMENTS

| | | | |
|---|---|---|---|
| 1,540,374 | 6/1925 | Stevens | 285/92 X |
| 1,580,694 | 4/1926 | Smith | 285/86 X |
| 1,622,581 | 3/1927 | Gunkel | |
| 2,709,093 | 5/1955 | Zeeb | 285/82 X |
| 2,745,303 | 5/1956 | Cornelius | 81/52.4 |
| 2,783,810 | 3/1957 | Wrigley | 151/34 |
| 3,069,187 | 12/1962 | Collins et al. | 285/82 X |
| 3,201,149 | 8/1965 | Bragg | 285/86 X |
| 3,273,443 | 9/1966 | Rubin | 85/61 |
| 3,383,973 | 5/1968 | Gazal | 85/62 |
| 3,555,491 | 1/1971 | Moss | 339/92 |
| 3,929,054 | 12/1975 | Gutshall | 85/61 |
| 4,170,163 | 10/1979 | Payne | 85/62 |
| 4,434,736 | 3/1984 | Szostak et al. | 112/258 |
| 4,609,314 | 9/1988 | Metz | 411/7 |
| 4,732,343 | 3/1988 | Maruyama | 242/84.2 |
| 4,784,549 | 11/1988 | Wing | 411/1 |
| 4,940,260 | 7/1990 | Odriozola | 285/92 X |

*Primary Examiner*—Dave W. Arola
*Attorney, Agent, or Firm*—David L. Narciso; Jerome C. Squillaro

[57] ABSTRACT

A redundant locking fluid coupling has a first coupling element including a coupling nut and a second coupling element including an outer ring biased towards the sealing end, such as by a coil spring. The coupling nut and outer ring include circumferential ends that are engaged when the coupling nut is tightened on the second coupling element inner member. Rotation of the coupling nut in a loosening direction is prevented by ratcheting teeth, or, in an alternative embodiment, complimentary sawtooth teeth, in the circumferential surfaces of the coupling nut and outer ring. Loosening of the coupling nut may be accomplished by sides of a wrench engaging a wrench lead in chamfer forcing axial movement of the outer ring to disengage the ratcheting teeth, or in the alternative embodiment, loosening torque being sufficient to overcome the thread torque and the increased frictional force across the complementary sawtooth teeth.

3 Claims, 2 Drawing Sheets

REDUNDANTLY LOCKED FLUID COUPLING

The U.S. Government has rights in this invention pursuant to Contract No. F33657-83C-0281 awarded by the Department of the Air Force.

FIELD OF THE INVENTION

This invention relates to fluid couplings and, more particularly, to a coupling for fluid lines including coupling elements which are subject to environmentally induced loosening and are therefore redundantly locked together.

BACKGROUND OF THE INVENTION

Coupling systems for interconnecting lines, such as electric lines or fluid conveying lines, must provide reliable service even in adverse operating conditions. For example, the couplings for fluid lines associated with the hydraulic or other systems of aircraft are subjected to vibration, temperature extremes, axial loading and a variety of other difficult operating conditions. Loosening of such couplings in operation could be catastrophic.

Fluid couplings typically comprise a coupling element with a seat and a second coupling element with a mating surface that are joined together by a coupling nut on one of the elements being threaded onto threads on the other element and tightened to force the coupling seat and mating surface together to achieve a fluid tight seal. Thread torque is conventionally used as a measure of whether an appropriate compression of the sealing surfaces to achieve a fluid tight seal has been reached and also as a measure that the threaded surfaces are sufficiently engaged to prevent loosening. Because of the vibration, temperature cycling, axial loading, and other operating conditions of aircraft, threaded connections that have been adequately "torqued" can often loosen after a period of time. In the case of a fluid coupling, even slight loosening will result in the coupling no longer providing the necessary fluid-tight connection. Coupling nuts in aircraft applications have conventionally been adapted to accommodate lockwire as a means of preventing rotation of the torque coupling nut in a loosening direction. Use of lockwire, however, presents problems in maintainability due to the time necessary for installation and accessibility to the coupling.

SUMMARY OF THE INVENTION

In accordance with the present invention, it is desirable to provide a simple and reliable coupling system that will enable a fluid coupling to be redundantly locked against loosening in an aircraft environment, including vibration, temperature cycling, and axial loading. It is also desirable that the coupling provide a redundant locking system, the primary locking feature being torque friction of the coupling threads.

Redundant locking of a coupling is achieved by a coupling having two coupling elements. The first coupling element includes an inner member having a seat for sealing the fluid connection and a coupling nut having internal threads for threadingly engaging the second coupling element to achieve the desired thread torque. The second coupling element has an end with a sealing portion to fit into the seat of the first coupling element, a threaded portion complementary to the coupling nut, and biasing means, such as a coil spring, biasing an outer ring towards the sealing end such. Accordingly, when the coupling is assembled and the coupling nut is threaded onto the second element, surfaces on circumferential ends of the coupling nut and the outer ring will become engaged, the surfaces being formed so as to allow rotation of the coupling nut in a tightening direction but to inhibit rotation of the coupling nut in a loosening direction. In a preferred embodiment, the circumferential surfaces may include ratcheting teeth whereby rotation in the loosening direction is prevented unless the teeth are disengaged.

In another embodiment, the circumferential end surfaces of the coupling nut and outer ring comprise complementary saw-tooth teeth such that rotating the coupling nut in a loosening direction is inhibited, in addition to thread torque, by the circumferential friction from the normal force of the spring loaded teeth. The additional force to be overcome is determined by the angle of inclination of the saw-tooth surfaces in concert with the spring load.

Disassembly of the coupling may be accomplished by compressing the spring, allowing sufficient axial movement of the outer ring away from the coupling nut to permit the coupling nut to be rotated in a loosening direction. This axial movement may be accomplished either by directly compressing the outer ring to provide total clearance of the teeth, as is necessary with ratcheting teeth, or simply by providing a sufficiently high loosening torque to overcome the circumferential frictional force in addition to the thread torque in a sawtooth type arrangement.

DESCRIPTION OF THE DRAWINGS

The structural operation and the advantages of the presently preferred embodiments of this invention will become further apparent upon consideration of the following description taken in conjunction with the accompanying drawings wherein.

DETAILED DESCRIPTION OF THE INVENTION

Figure 1:
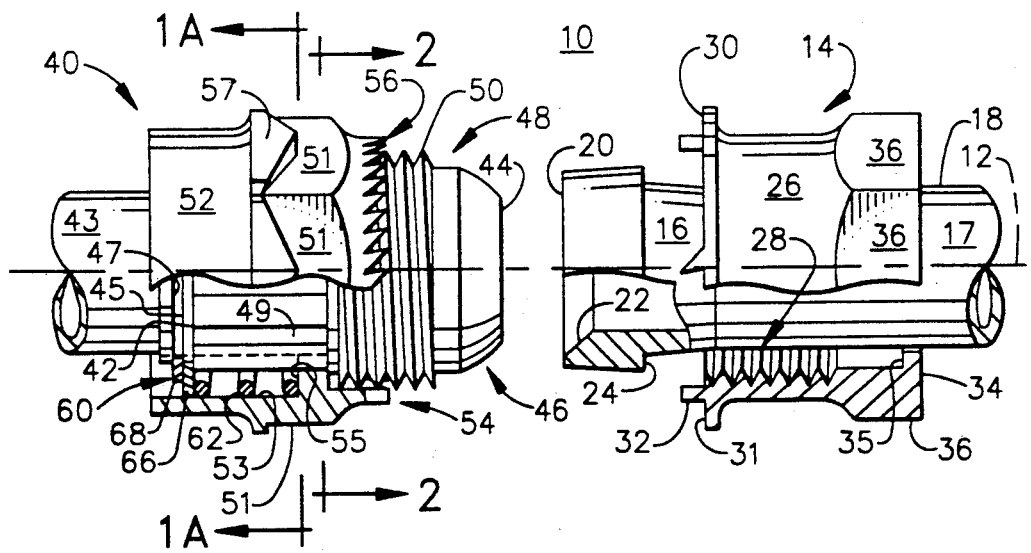
FIG. 1 is an illustration of a cutaway view in partial cross section of coupling elements prior to engagement with one another showing one embodiment of the invention.

Like reference numerals have been used to designate like or corresponding parts throughout the several views.

Referring now to FIG. 1, a cutaway view in partial cross section of an unassembled coupling 10 having a longitudinal axis 12 and comprising a first coupling element 14 and a second coupling element 40. For purposes of the present discussion, the coupling device 10 is illustrated for use in connection with fluid lines 17 and 43 which convey liquid or gaseous fluids, although it is contemplated that the coupling device 10 could be employed in essentially any application requiring a joint between two conduits or lines of a given type. It is also contemplated that first and second coupling element inner members 16 and 42, respectively, could be at least partially formed integrally with fluid lines 17 and 43, respectively.

First coupling element 14 comprises an inner member 16 which may be formed integrally with or fixedly attached, such as by welding, to fluid line 17. The inner member 16 has an outer surface 18 and a first end 20 including a seat 22. An annular surface 24 extends outwardly from the first coupling element inner member 16 to engage coupling nut 26 inward extending flange 34 for tightening the coupling. Coupling nut 26 includes a threaded internal surface 28 and a first end 30. Coupling nut 26, in this preferred embodiment, includes means for inhibiting loosening of the coupling by way of four circumferentially spaced ratchet teeth 32 extending axially from first end 30. First end 30 also has a annular surface 31 extending radially outward and wrench flats 36. First coupling element inner member 16, annular surface 24, and/or mating surface 35 of coupling nut inward extending flange 34 may include a coating such as a thin layer of silver plating or a dry film lubricant to prevent binding of the surfaces 24 and 35 when the coupling experiences high thread torque and resultant high pressure forces across surfaces 24 and 35.

Second coupling element 40 is shown having inner member 42 which may be formed partly or wholly integrally with, or fixedly attached, such as by welding, to fluid line 43. Second coupling element inner member 42 includes a first end 44 with a sealing portion 46, shown in this embodiment as a conventional ball nose fitting, and a second portion 48 with a threaded external surface 50 having complementary threads to coupling nut threaded internal surface 28. Second coupling element inner member 42 further includes a section with spline means 49 extending to radially extending surface 45. Inner member 42 also includes groove 47 for a split ring or locking ring 68. Second coupling element 40 outer member also includes outer ring 52 with a first end 54 having circumferentially continuous axial extending ratchet teeth 56. The outer ring 52 also includes spline means 59, which are complementary to inner member spline means 49, for circumferentially fixing the location of the outer ring. The outer ring also includes wrench flats 51, a cylindrical portion 53 for housing a spring 62, and an inner annular surface 55. Flange 57, including wrench lead in chamfer 80, extends outward from outer ring 52 such that the wrench flats 51 are between the outward extending flange 57 and the first end 54.

Biasing means 60 comprise spring 62 located within the cylindrical portion 53 of outer ring 52, spring 62 engages a washer 66 retained in place by a split ring or a locking ring 68, with the opposite end of spring 62, engaging an annular surface 55 of outer ring 52 such that the spring 62 is at least lightly compressed, preloading outer ring 52.

Figure 1A:
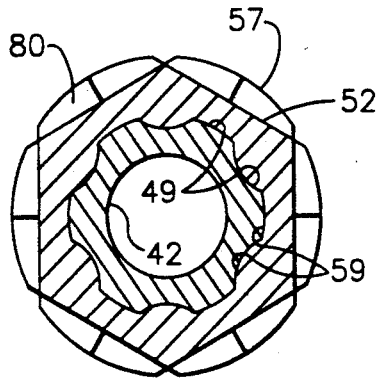
FIGURE 1A is an illustration of a cross-sectional view along lines 1A—1A of FIG. 1.

FIG. 1A shows wrench load in chamfer 80 on outer ring 52 such that a conventional open end wrench can be inserted to engage two oppositely facing wrench flats without interference from portions of wrench lead in chamfer 80 on adjacent wrench flats.

Figure 2:
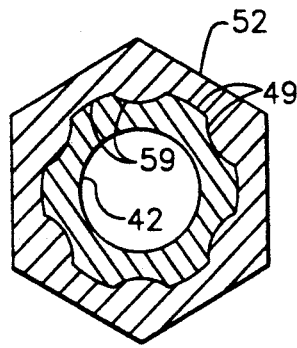
FIG. 2 is an illustration of a cross-sectional view along lines 2—2 of FIG. 1.

FIG. 2 is a cross-sectional view along plane 2—2 of FIG. 1 showing spline means 49 of inner member 42 and the complementary spline means 59 of outer ring 52 such that rotation of outer ring 52 with respect inner member 4 is prevented.

As shown in FIGS. 1 and 2, spline means 49 and 59 allow axially sliding movement of outer ring 52 with respect to inner member 42 while the circumferential engagement of outer ring 52 is fixed with respect to inner member 42. It is also apparent that the coupling nut of the first coupling element is both axially and circumferentially moveable with respect to first coupling element inner member 16.

Figure 3:
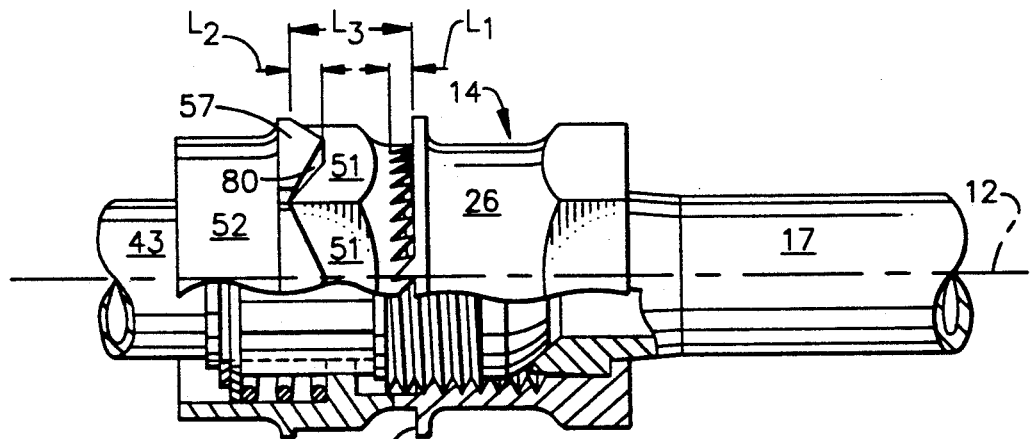
FIG. 3 is an illustration of a cutaway view in partial cross section of the assembled embodiment of FIG. 1.

FIG. 3 shows the coupling of FIG. 1 with coupling nut 26 threaded onto second coupling inner member 42 such that the sealing portion 46 is engaged with first coupling element inner member sealing seat 22. Circumferential ratchet teeth 32 of coupling nut 26 are engaged with the circumferential ratchet teeth 56 of outer ring 52 an axial length L1, corresponding in this embodiment to the axial length of ratchet teeth 32. Consequently, rotation of coupling nut 26 is prevented unless the outer ring 52 is displaced thus allowing rotation of the coupling nut 26 in a loosening direction. Such disengagement may be accomplished by inserting a wrench of sufficient width onto wrench flats 51 such that it will force flange 57, which is on axially moveable outer ring 52, away from annular surface 31 of coupling nut 26 which is axially fixed. Displacement of the outer ring 52 may be accomplished by engaging a wrench with wrench flats 51 and compressing spring 62 sufficient to rotate coupling nut 26 in a loosening direction.

Assembly of coupling 10, as shown on FIG. 3, is accomplished by axially aligning first coupling element 14 with second coupling element 40 and inserting second coupling element inner member sealing portion 46 into first coupling inner member seat 22 and engaging coupling nut 26 with second coupling element inner member threaded portion 50. A conventional open-end wrench should be engaged with second coupling element outer ring 52 wrench flats 51 to restrain twisting of second coupling element 40 as coupling nut 26 is tightened on the second coupling element inner member 42. A second conventional wrench is used to engage the coupling nut wrench flats 36 and rotate in a tightening direction. The length of the coupling nut threaded portion 28 should be as is conventional such that sufficient coupling nut threads and second element external threads will be engaged to provide the necessary torque as determined by the application in which the coupling will be installed. The outer ring 52 of the second coupling element 40 is preloaded such that prior to circumferential ratcheting teeth 32 and 56 engaging the spring 62 biases the outer ring 52 toward second coupling inner member first end 44, but is stopped where spline means 49 reach end of the inner member spline means 59 and the outer ring 52 should be sized such that the complementary ratcheting teeth 32 and 56 will permit rotation of the coupling nut in a tightening direction but will be fully engaged to prevent rotation in a loosening direction when the appropriate torque is reached. As shown in FIG. 3, the assembled coupling will have slightly compressed the spring 62 from its preloaded position.

Disassembly is the coupling shown in FIG. 3 is accomplished by engaging a wrench with outer ring wrench flats 51 and further compressing spring 62 such that outer ring ratchet teeth 56 are totally disengaged from coupling nut ratchet teeth 32 and using a wrench to rotate coupling nut 26 in a loosening direction. Displacement of the coupling nut may be accomplished in this preferred embodiment by using a wrench of sufficient width that engaging the wrench flats 51 of outer ring 52 will cause the sides of the wrench used to further engage the wrench lead-in chamfer 80 and the coupling nut annular surface 31 forcing the outer ring 52 away from the coupling nut 26 sufficient for the required clearance of ratchet teeth 32 and 56. In order to use a wrench in this manner, it is necessary to design the wrench lead-in chamfer considering the width of the wrench to be used in this application the distance between the coupling nut annular surface 31 and the outer ring outward extending flange 57, denoted in FIG. 3 as L3, the length of the engaged ratchet teeth L1 and the width of the wrench to be used. It is necessary that the width of the wrench is less than L3 so that as the wrench is inserted onto wrench flats 51 it will engage both annular surface 31 and the wrench lead-in chamfer 80. It is also necessary that the lead-in chamfer distance L2 plus the wrench width be greater than the distance L3 plus the distance L1 in order for total disengagement of outer ring ratchet teeth 56 from coupling nut ratchet teeth 32.

Figure 4:
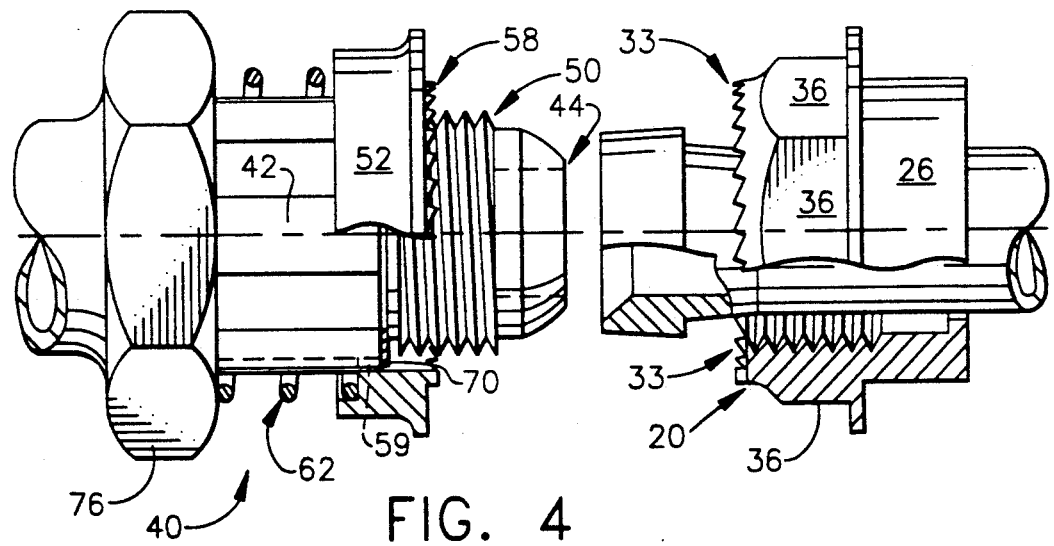
FIG. 4 is an illustration of a cutaway view in partial cross section of coupling elements in a second embodiment of the invention prior to engagement with one another.

Referring now to FIG. 4, a second embodiment of the invention is shown with a coupling 11 substantially the same as coupling 10 with the following distinguishing characteristics. Coupling nut 26 of coupling 11 has wrench flats 36 proximate first end 20 rather than distal from first end 20 as in first coupling 10 and first end 20 includes circumferentially continuous sawtooth teeth 33 rather than ratcheting teeth as in coupling 10. Second coupling element 40 of coupling element 11 is also different in that wrench flats 76 are affixed to second coupling inner member 42 rather than the outer ring 52. Further, to accommodate assembly of outer ring 52 over second coupling element inner member threaded portion 50, the complementary splines means 49 and 59 on inner member 42 and outer ring 52, respectively, are of a larger diameter than the threaded portion 50; but, otherwise, are as shown in FIG. 2. Outer ring 52 includes complementary circumferentially continuous sawtooth teeth 58 at first end 54 instead of the ratchet teeth 56 of coupling 10. Assembly of second coupling element 40 of coupling 11 is accomplished by inserting spring 62 from first end 44 until it is over the spline means portion 49 and then likewise installing the outer ring 52 aligning the outer ring spline means 59 with the complementary second coupling element inner member spline means 49 and compressing the spring slightly then installing locking ring 70 into circumferential groove 71 on second coupling element inner member 52, then releasing the outer ring 52 to its spring loaded condition, as shown in FIG. 4.

Figure 4A:
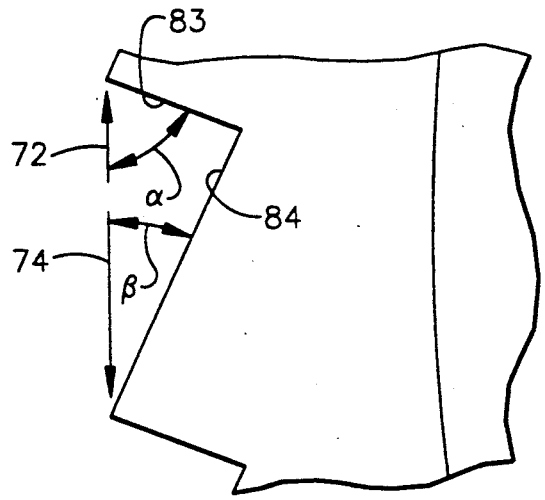
FIG. 4A is an illustration of an enlarged section of coupling teeth of FIG. 4.
Figure 5:
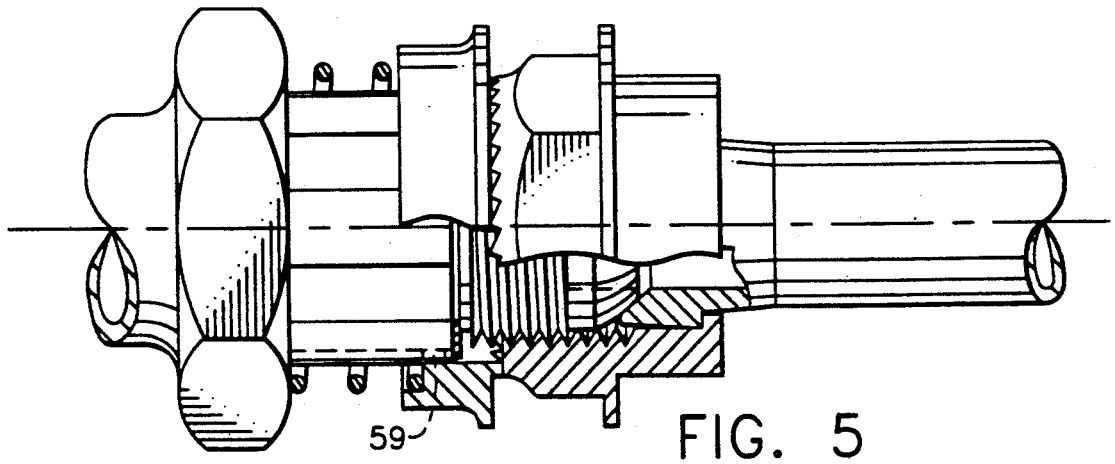
FIG. 5 is an illustration of a cutaway view in partial cross section of the assembled embodiment of FIG. 4.

FIG. 4A shows an enlarged view of the sawtooth teeth 33 of coupling nut 26 with α representing the slope or angle of coupling nut surface 83 opposing rotation of the coupling nut in a loosening direction and α representing the slope or angle of coupling nut surface 84 opposing rotation of the coupling nut in the tightening direction. Design of the sawtooth arrangement of coupling 11 needs to take into consideration the vibration, axial loading, and other operating conditions that will effect the necessary normal force across the mating sawtooth surfaces to prevent disengagement of the sawtooth surfaces and/or rotation of the coupling nut 26 in a loosening direction. This can be accomplished by determining the loads necessary to prevent movement of the outer ring 52 away from the coupling nut 26 that would allow such disengagement particularly in a vibration environment. Secondly, the angle α should be designed such that it will keep or prevent loosening of the coupling nut 26 in such environments, but without too high a safety margin that it would prevent loosening of coupling nut 26 by application of additional torque in a loosening direction without damaging the tooth surfaces or the coupling nut members. FIG. 5 shows the coupling nut 11 in an assembled configuration. Coupling 11 is assembled by applying a wrench to wrench surfaces 76 to prevent rotation of the second coupling element while the coupling nut 26 is threaded onto and torqued, by applying a second wrench to wrench surface 36, onto threaded surfaces 50 of second coupling element inner member 42. Installation of the coupling nut 26 is as conventional with a predetermined torque being reached, such that when the coupling nut has reached the necessary tightening torque value the sawtooth surfaces are fully engaged and the spring 62 is compressed to provide the required normal force for the desired preloaded condition.

Disassembly of coupling 11 of FIG. 5 is accomplished by engaging wrench flats 76 to prevent rotation of second coupling element inner member 42 while a second wrench engages wrench flats 36 on coupling nut 26 and rotates the coupling nut in a loosening direction. The loosening torque necessary being that of the thread torque plus the torque necessary to overcome the normal forces on the circumferentially extending sawtooth 33 surfaces 82 opposing the rotation in this loosening direction.

The present invention and many of its intended advantages will be understood from the foregoing description and it will be apparent that various changes may be made in the form, construction, and arrangement of the parts thereof without departing from the spirit and scope of the invention or sacrificing its material advantages, the apparatus hereinbefore described being preferred and exemplary embodiments.

What is claimed is:
1. A coupling having a longitudinal axis, said coupling comprising:
  (a) a first coupling element, comprising:
    (i) an inner member having a first end including a seat; and
    (ii) a coupling nut having a threaded internal portion, a first end, and an annular surface extending radially outward substantially adjacent said first end, said coupling nut being coupled to said first coupling element inner member such that said coupling nut may move axially and circumferentially with respect to said first coupling element inner member; and
  (b) a second coupling element, comprising:
    (i) an inner member having a first end, a sealing portion adapted to sealingly engage said first coupling element inner member seat, a threaded portion adapted to engage said coupling nut threaded internal portion, and axial spline means; wherein said first coupling element and said coupling nut have coacting abutment means wherein said coupling nut is threadedly engageable with said second coupling element inner member and rotatable in a tightening direction such that said abutment means engage and said seat engages said sealing portion to achieve a fluid tight seal;
    (ii) an outer ring having a first end, at least two wrench flats, an annular flange extending out- ward substantially adjacent said wrench flats with a wrench lead-in chamfer extending axially towards said outer ring first end, wherein said wrench flats are located between said annular flange and said first end, and spline means complementary to and axially aligned with said second coupling element inner member spline means such that said outer ring is coupled to said second coupling element inner member in axially sliding and circumferentially fixed engagement; and (iii) biasing means coupled to said second coupling element inner member and outer ring urging said second coupling element outer ring axially in the direction of said second coupling element inner member first end;

wherein said first end of said coupling nut and said first end of said outer ring include intermeshing ratcheting teeth allowing rotation of said coupling nut in a tightening direction and preventing rotation of said coupling nut in a loosening direction by said biasing means perssing said outer ring ratcheting teeth into interference with said coupling nut ratcheting teeth when a fluid tight seal has been achieved; and wherein when a fluid tight seal has been achieved said biasing means may be compressed to allow sufficient axial movement of said outer ring away from said second coupling element inner member first end to permit said coupling nut to be rotated in a loosening direction;

whereby a wrench engaging said outer ring wrench flats would disengage said ratcheting teeth by sides of the wrench engaging said wrench lead-in chamfer and said coupling nut annular surface, forcing said outer ring annular flange away from said coupling nut annular surface, and would retain such disengagement to allow rotation of said coupling nut.

2. The coupling of claim 1, wherein said coupling nut further comprises at least two wrench flats.

3. A coupling having a longitudinal axis, said coupling comprising:

(a) a first coupling element, comprising:

(i) an inner member having a first end including a seat; and (ii) a coupling nut having a threaded internal portion, a first end, said coupling nut being coupled to said first coupling element inner member such that said coupling nut may move axially and circumferentially with respect to said first coupling element inner member; and (b) a second coupling element, comprising:

(i) an inner member having a first end, a sealing portion adapted to sealingly engage said first coupling element inner member seat, a threaded portion adapted to engage said coupling nut threaded internal portion, and axial spline means; wherein said first coupling element and said coupling nut having coating abutment means wherein said coupling nut is threadedly engageable with said second coupling element inner member and rotatable in a tightening direction such that said abutment means engage and said seat engages said sealing portion to achieve a fluid tight seal;

(ii) an outer ring having a first end and spline means complementary to and axially aligned with said second coupling element inner member spline means such that said outer ring is coupled to said second coupling element inner member in axially sliding and circumferentially fixed engagement; and (iii) biasing means coupled to said second coupling element inner member and outer ring urging said second coupling element outer ring axially in the direction of said second coupling element inner member first end;

wherein said first end of said coupling nut and said first end of said outer ring include complementary sawtooth teeth, said coupling nut sawtooth teeth having surfaces with a slope opposing rotation of the coupling nut in a tightening direction less than a slope with an acute angle opposing rotation of the coupling nut in a loosening direction;

whereby rotating of said coupling nut in the loosening direction is inhibited by said biasing means pressing said outer ring sawtooth teeth into engagement with said coupling nut sawtooth teeth increasing frictional forces between mating sawtooth teeth surfaces.

* * * * *